June 4, 1963 W. A. BEAUDRY ETAL 3,092,271
AUTOMATIC TOWEL FLATTENING DEVICE
Filed Aug. 13, 1959 12 Sheets-Sheet 2
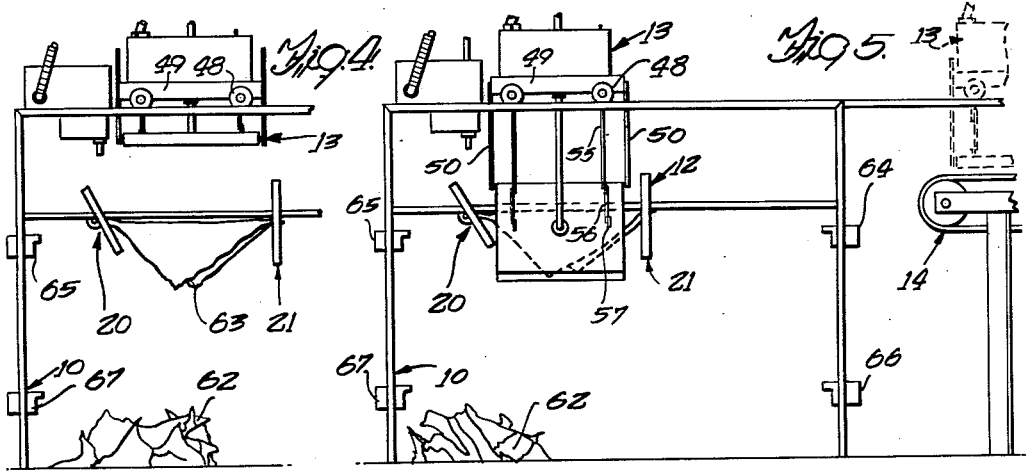
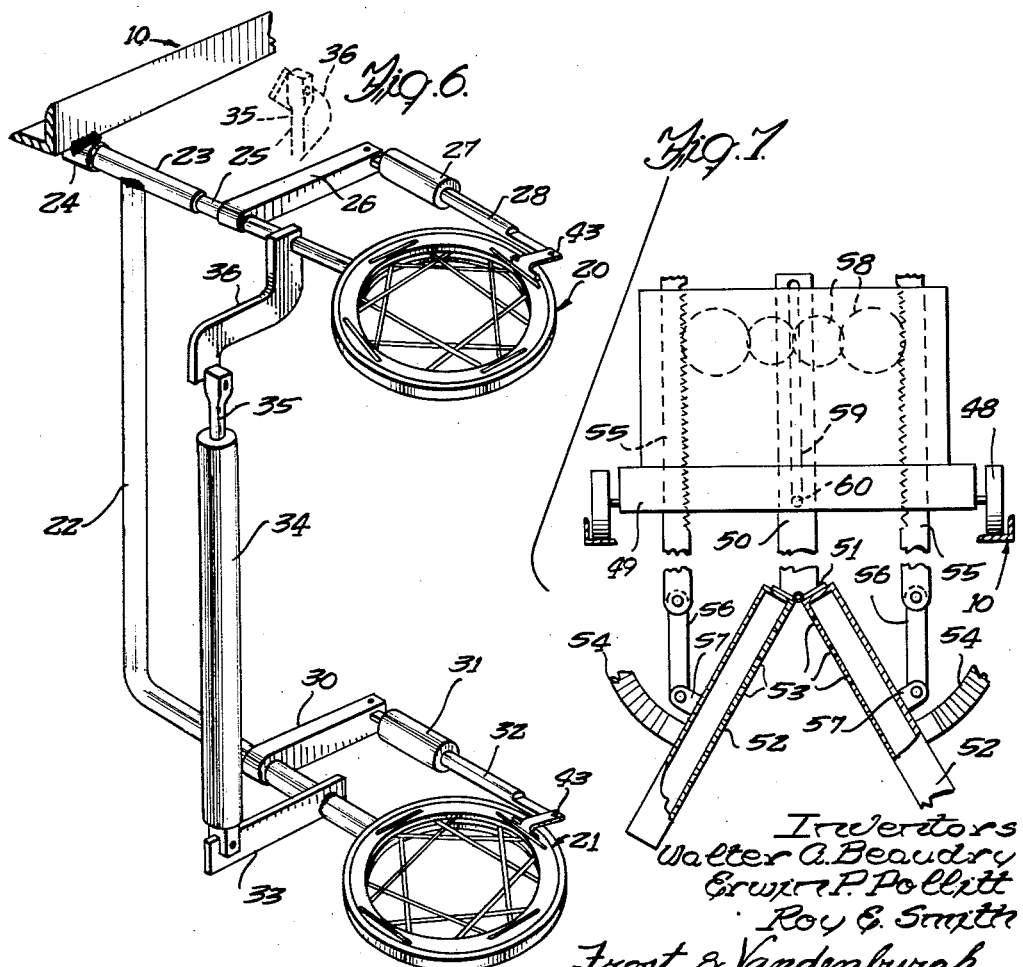
Inventors
Walter A. Beaudry
Erwin P. Pollitt
Roy E. Smith
Frost & Vandenburgh
Attorney

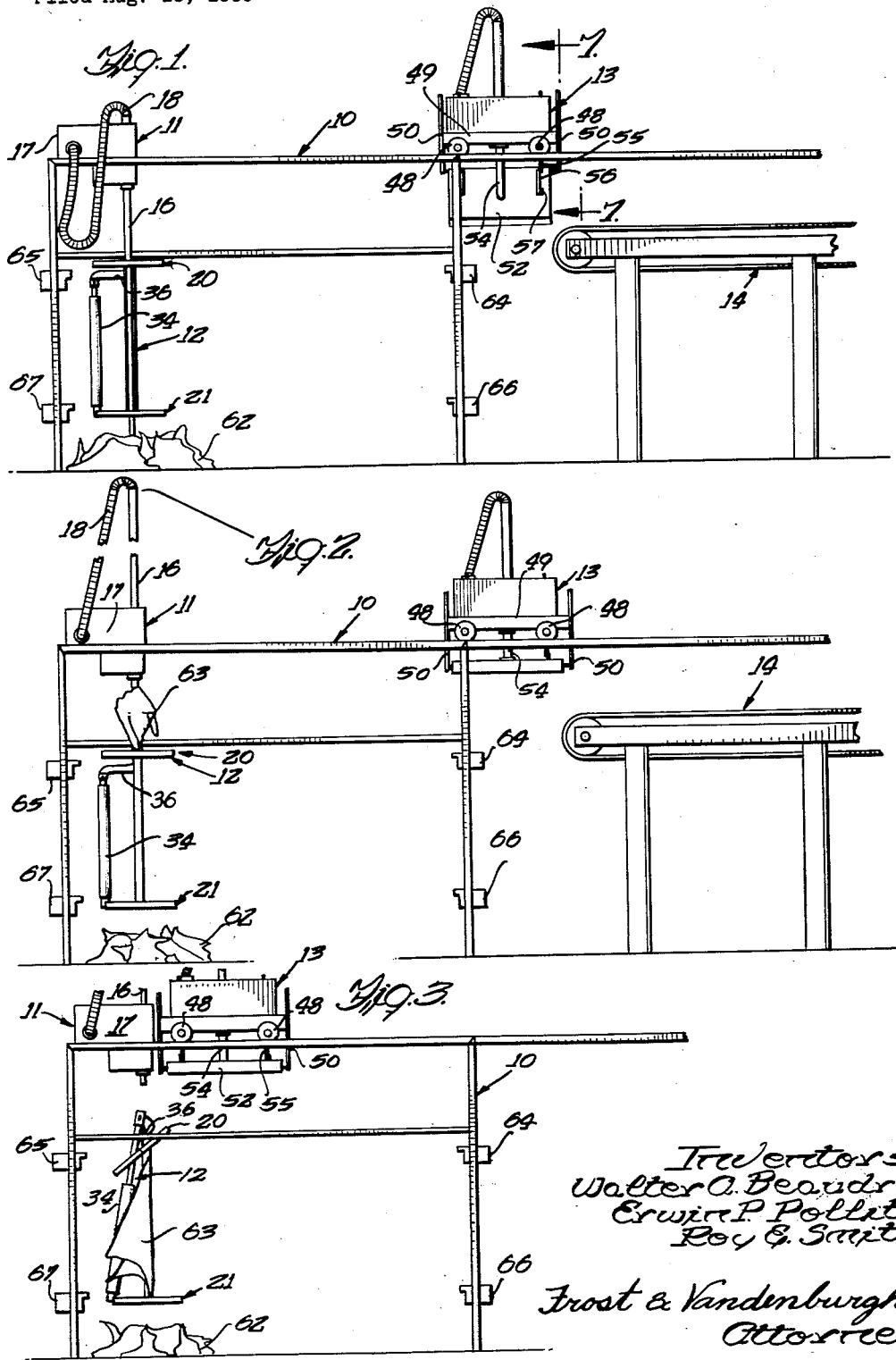

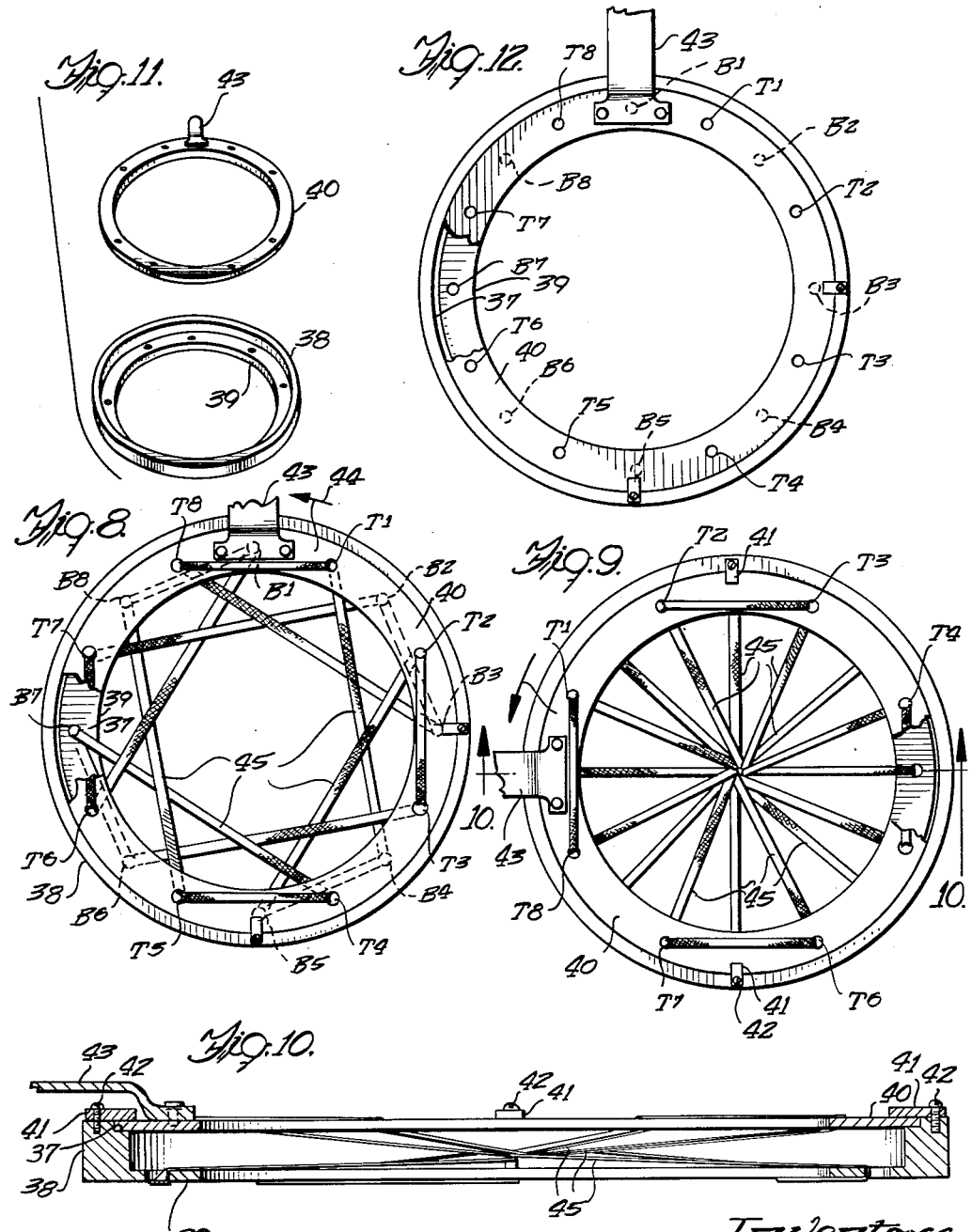

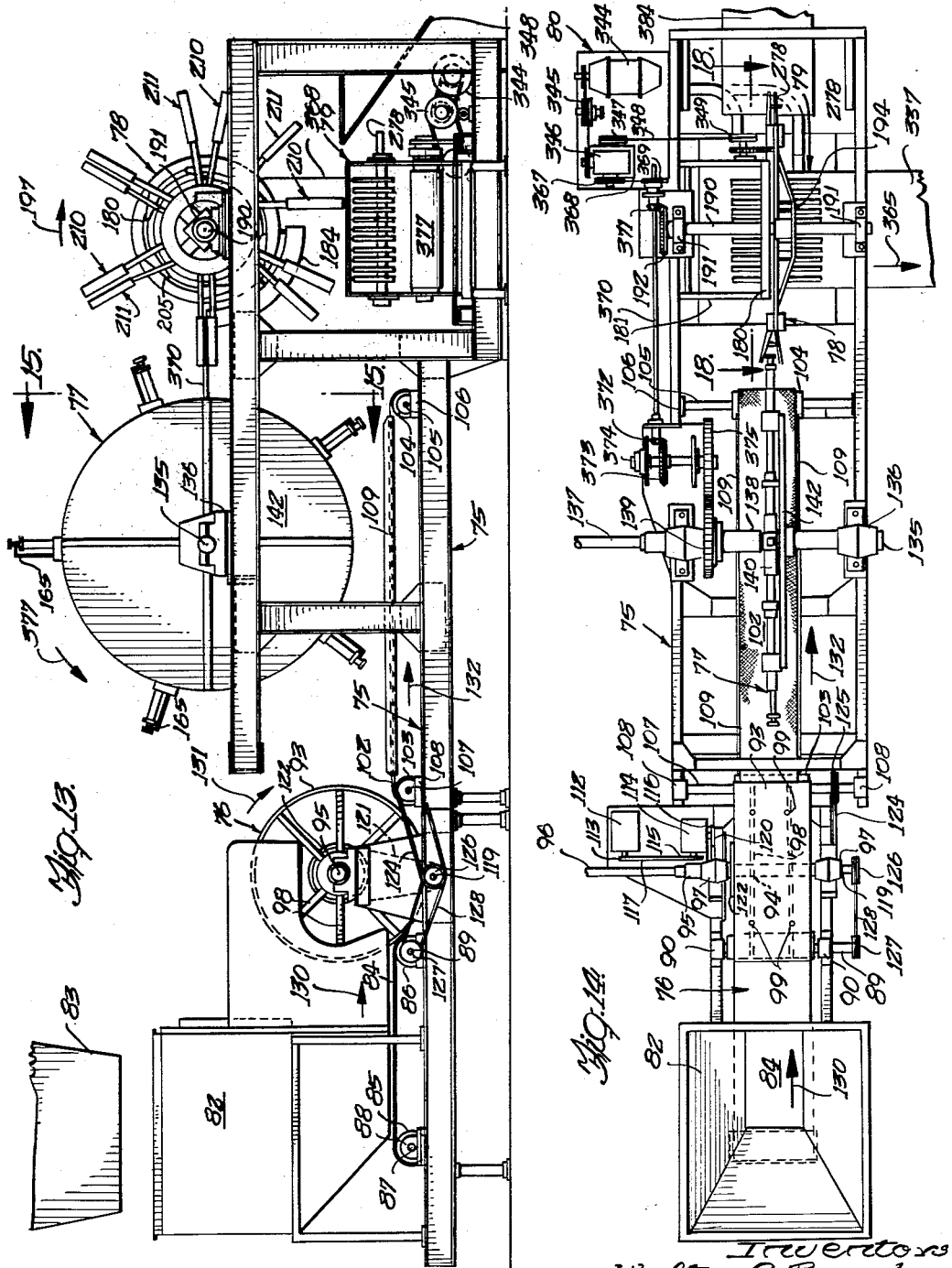

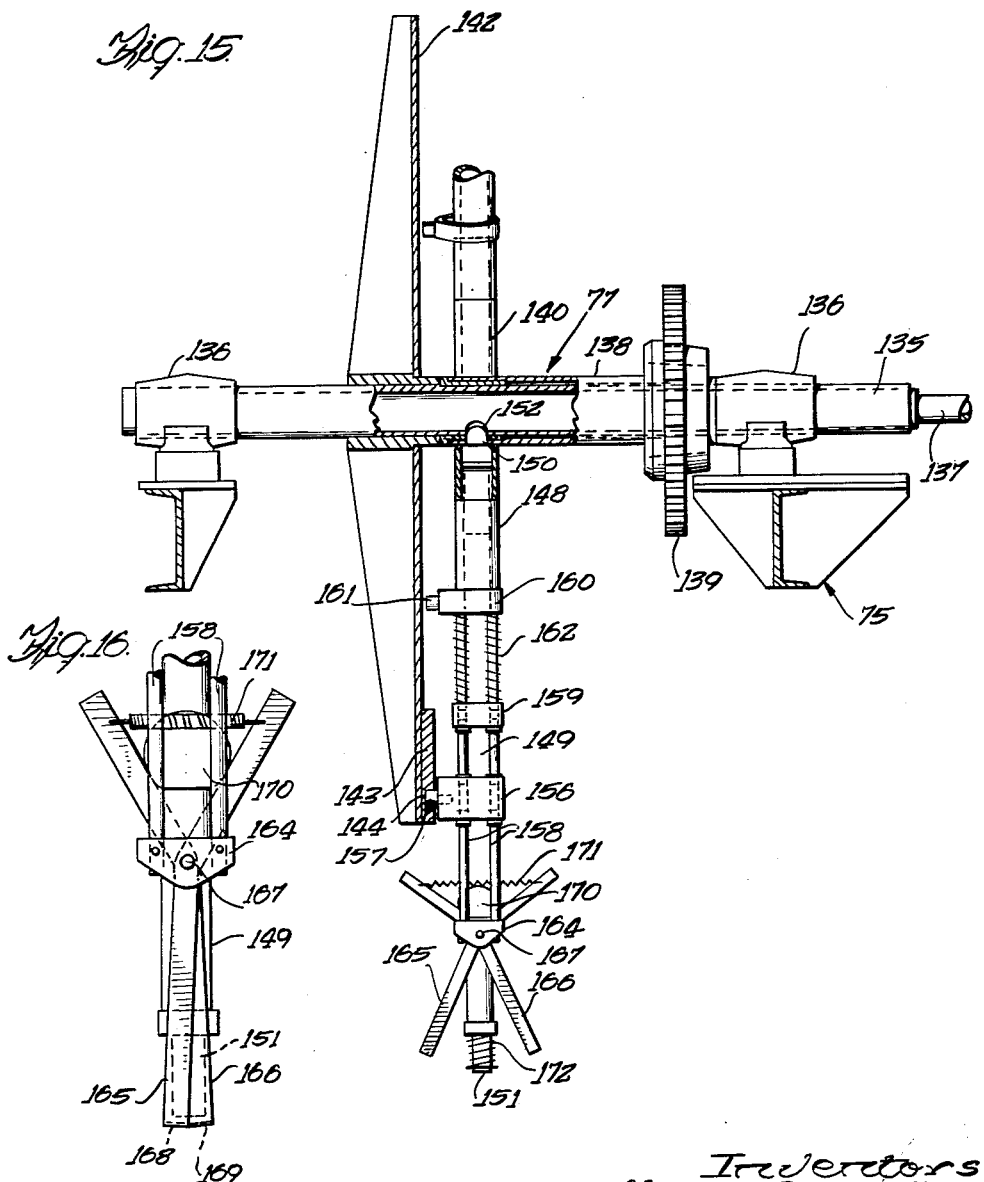

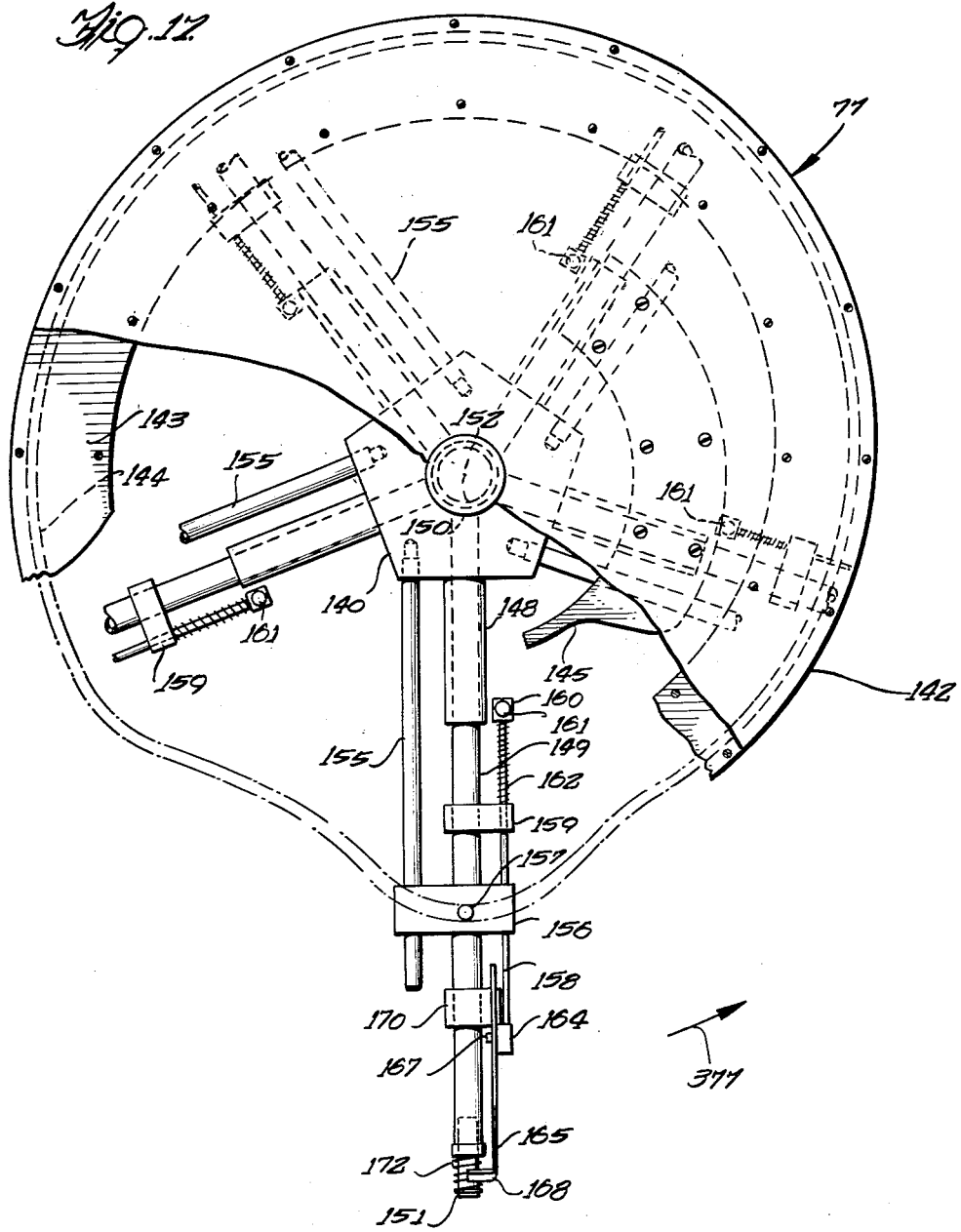

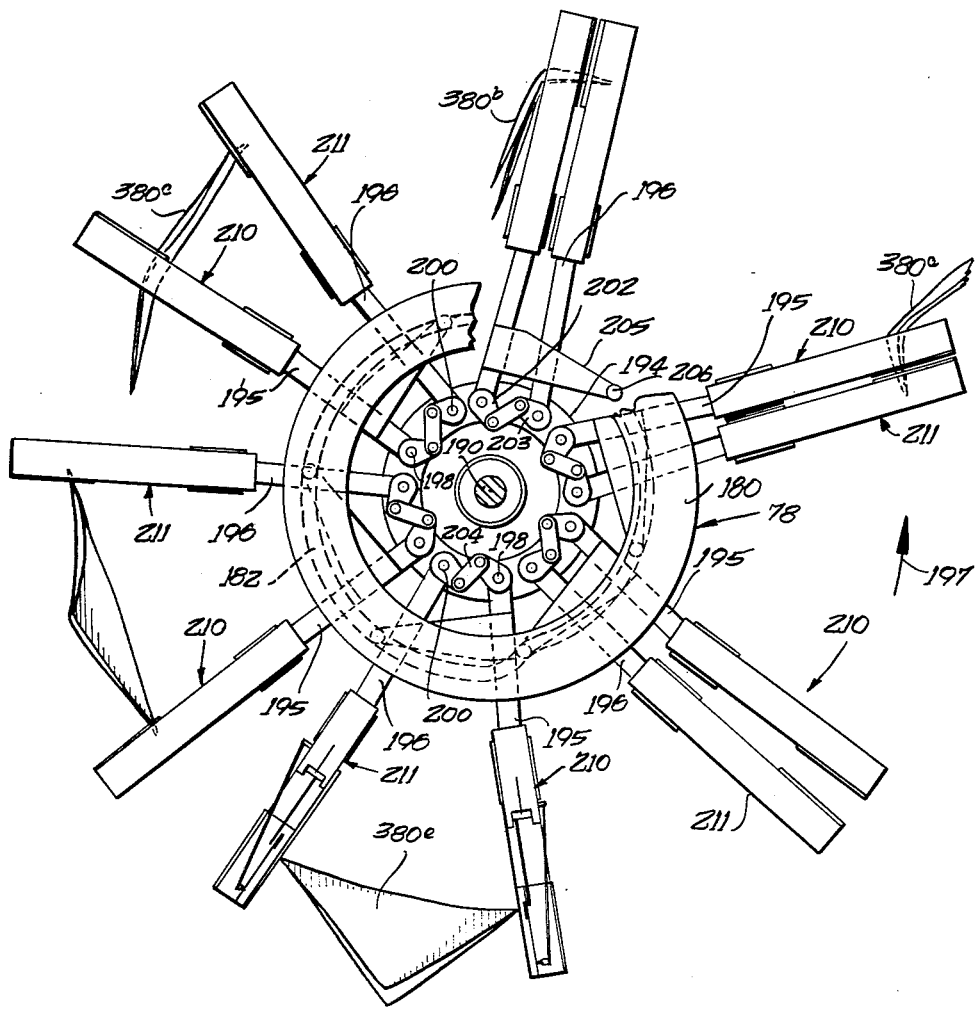

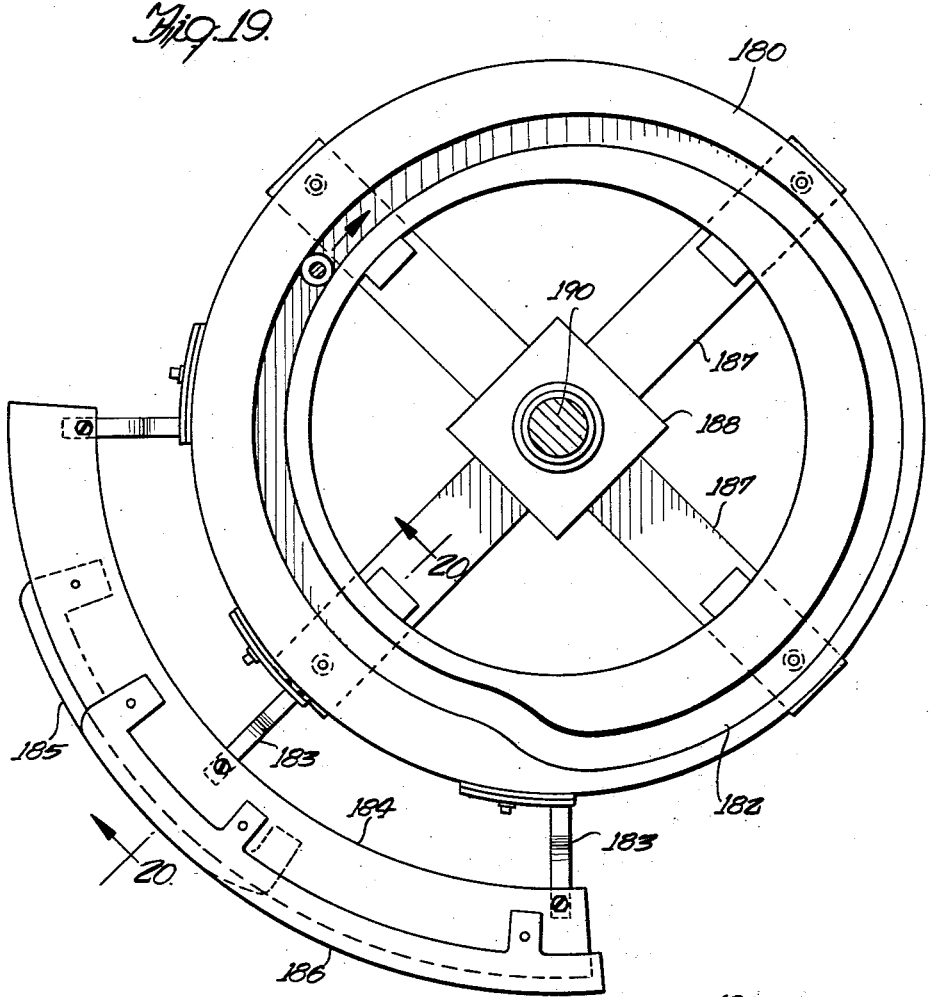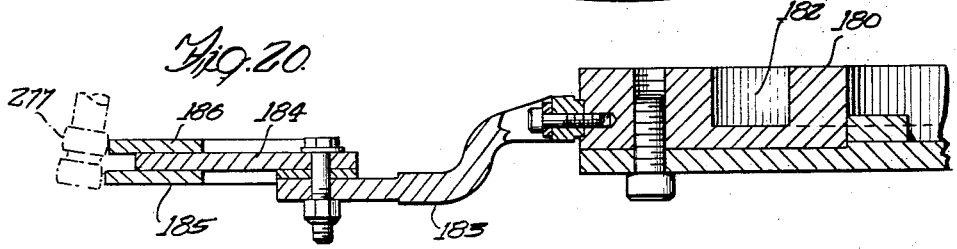

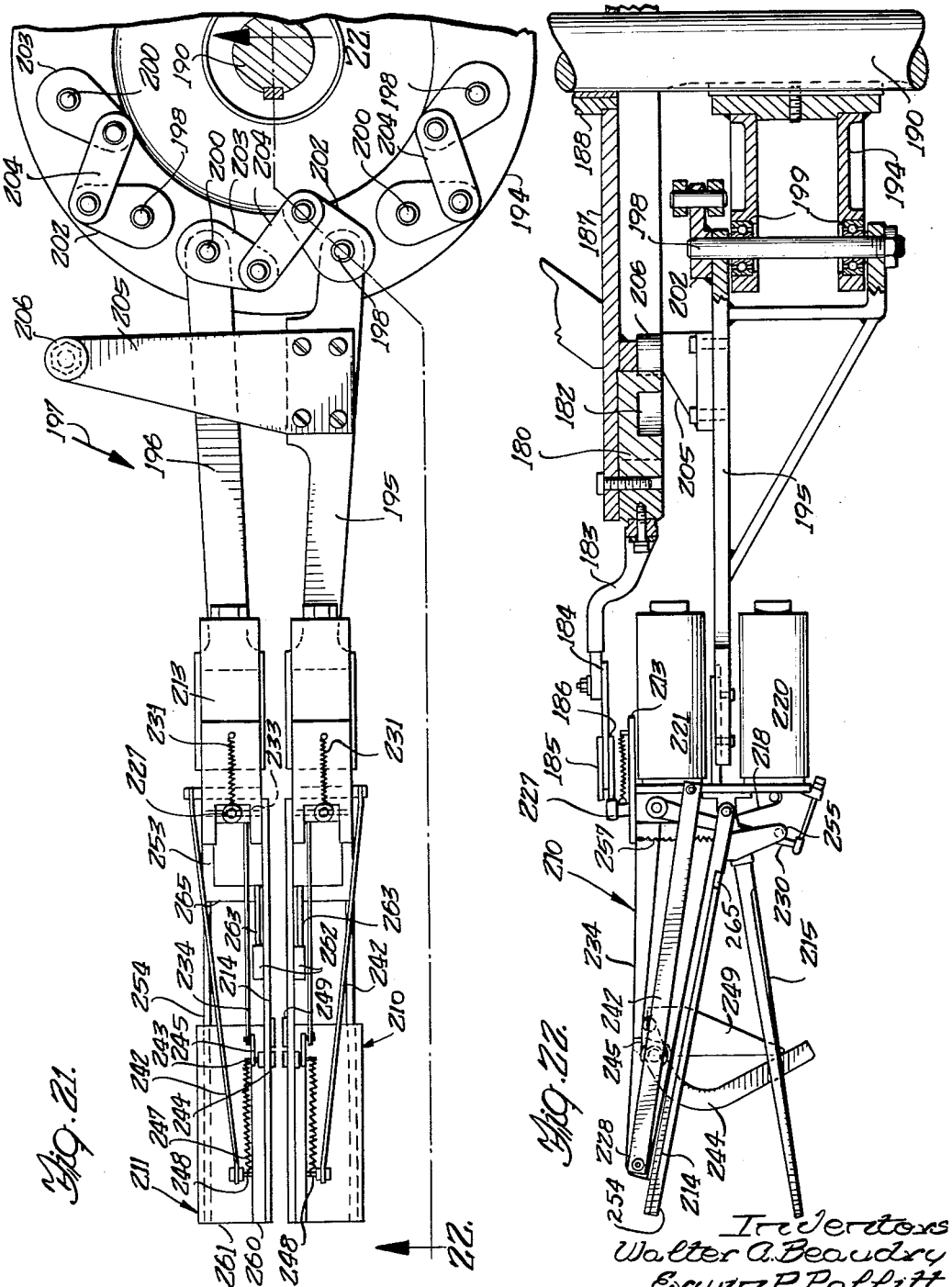

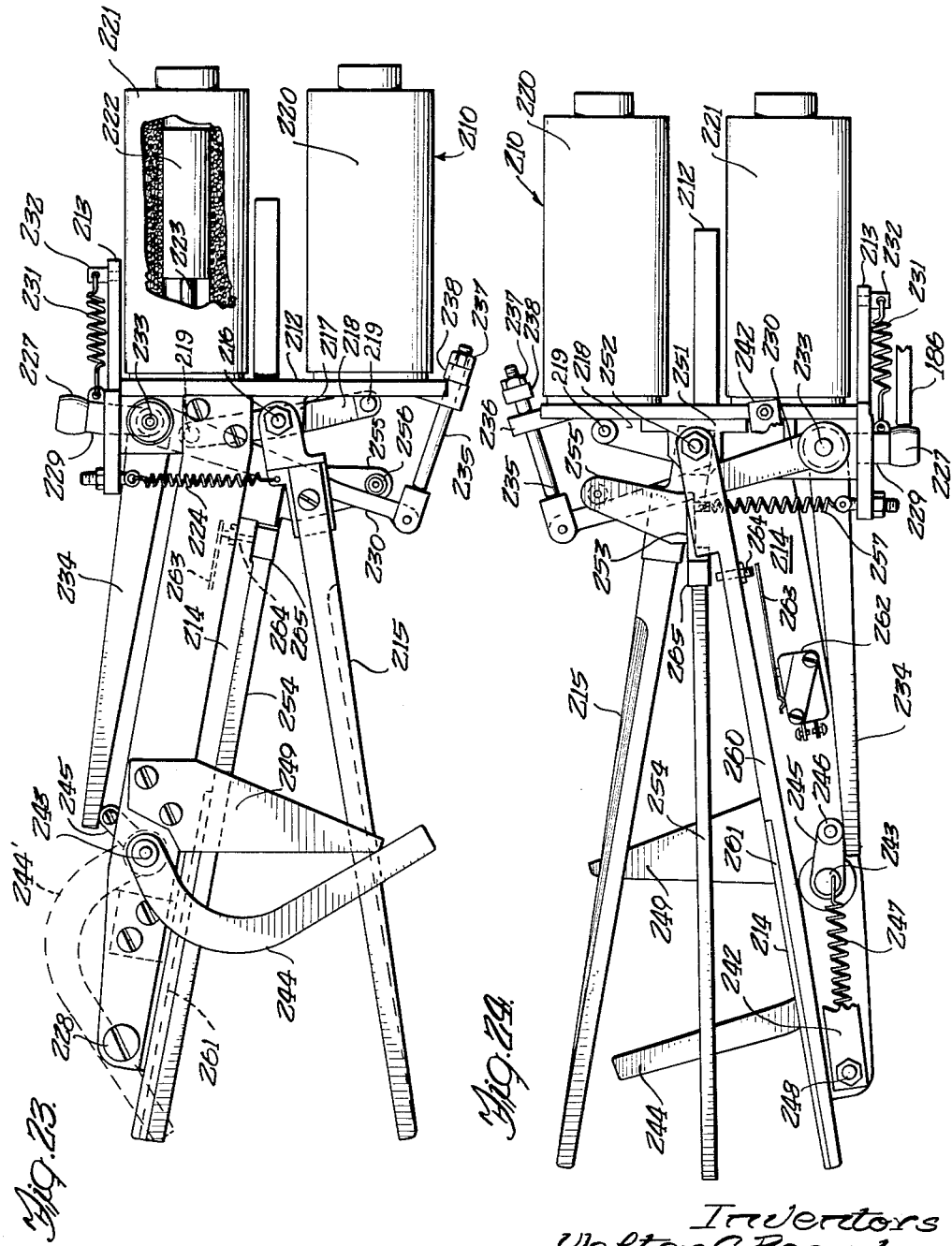

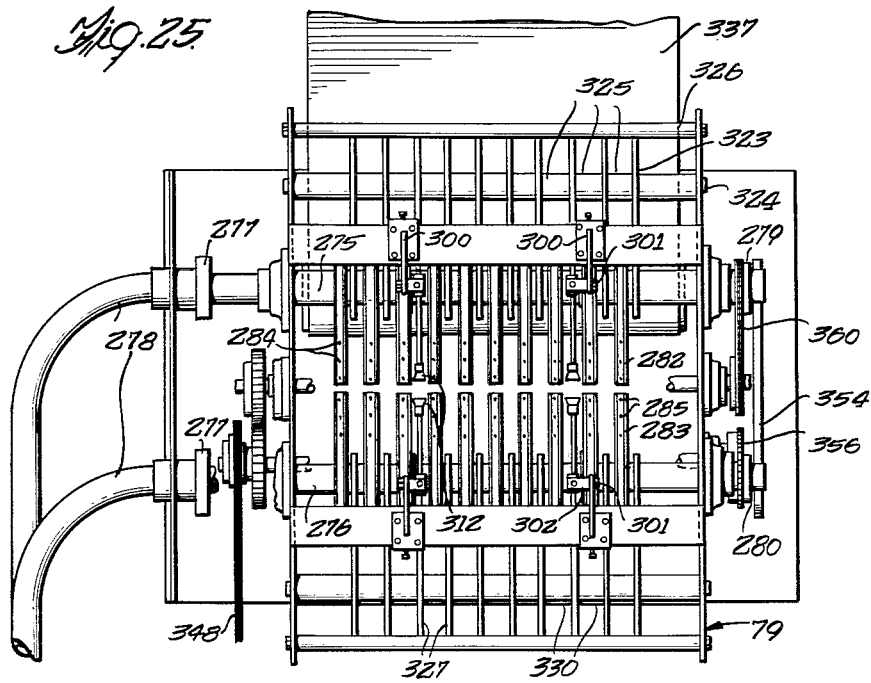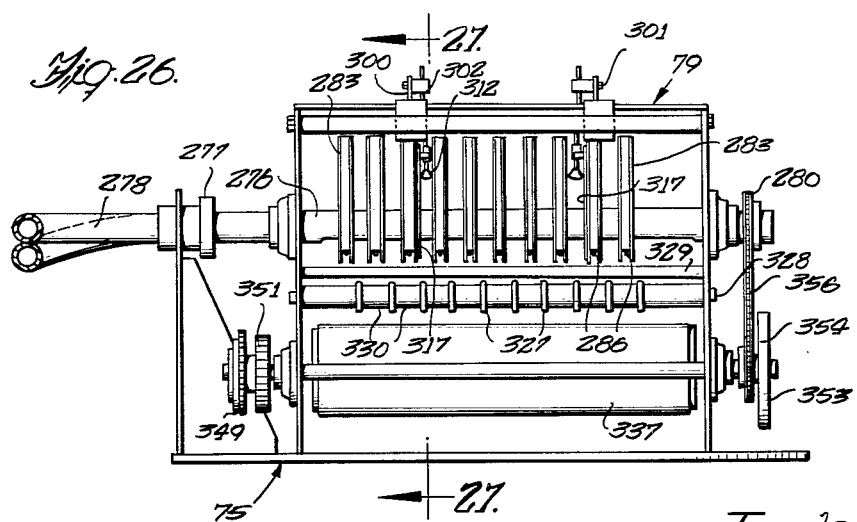

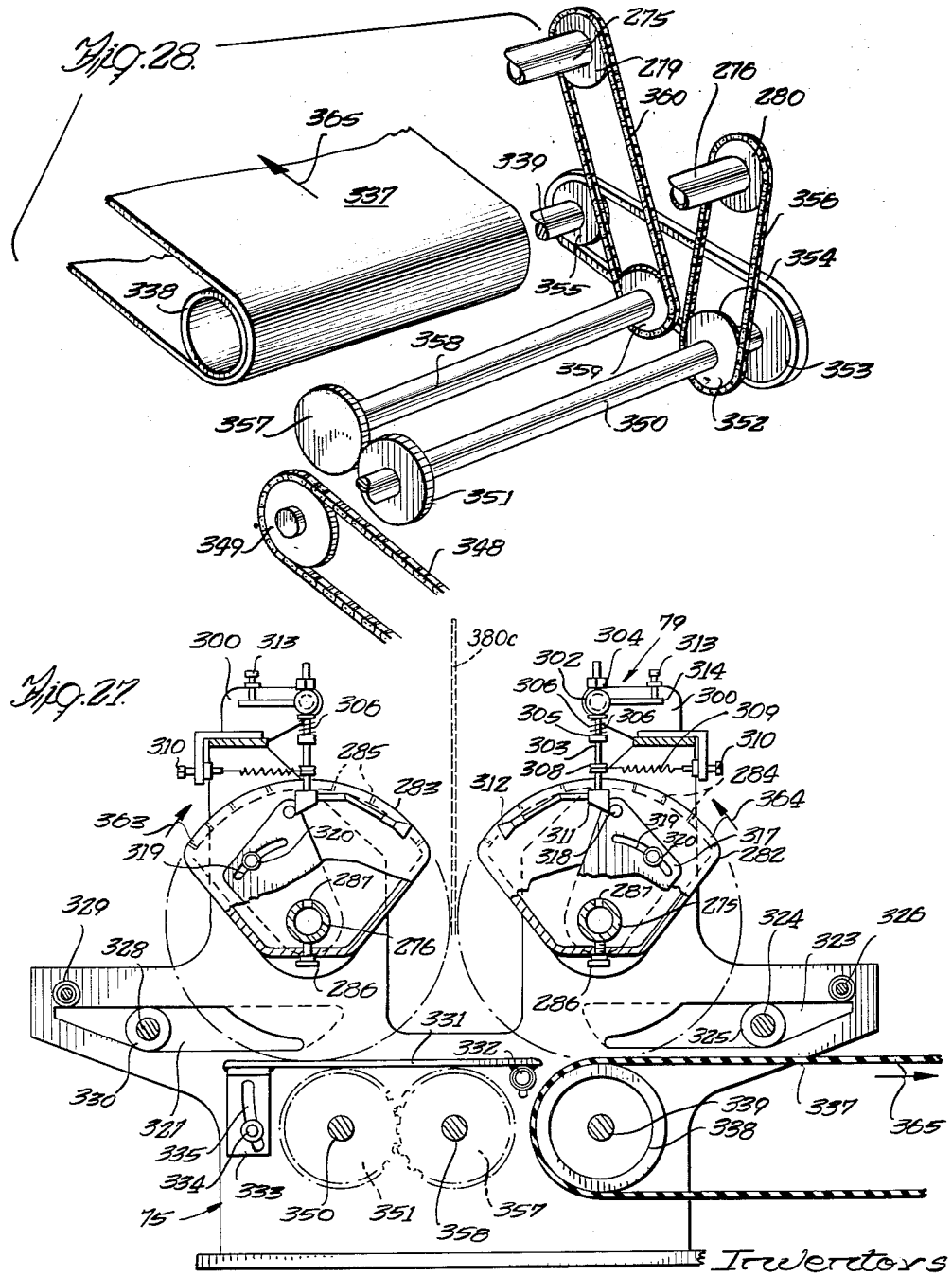

3,092,271
AUTOMATIC TOWEL FLATTENING DEVICE
Walter A. Beaudry and Erwin P. Pollitt, Chicago, and Roy E. Smith, Villa Park, Ill., assignors, by mesne assignments, to F. W. Means & Company, a corporation of Illinois
Filed Aug. 13, 1959, Ser. No. 833,539
4 Claims. (Cl. 214—152)

The present invention relates to a method and apparatus for flattening towels or the like.

While the present invention will have application in diverse fields, the hereinafter described embodiments are for use in the towel supply industry. After the towels have been brought back from the user, laundered and dried, the first step that must be performed before returning the towels to the user is to extract the individual towels from the group of which they were a part during the laundering and drying process. The towels may be merely stacked in neat regular piles before return; they may be folded and then stacked; or they may be ironed, folded and/or stacked. Each of these subsequent alternatives may be performed by automatic machinery, but for that automatic machinery to function satisfactorily, it is necessary that each towel be extracted individually from the group in which it was washed and dried, and the towel flattened so as to be received in regular order by the automatic machinery of whichever of the following processing steps is to be performed. If the towel is laid out flat on a conveyor, in a predetermined orientation, the following automatic machinery has no particular problem in performing its function whether it be stacking, folding and/or ironing.

Traditionally this step of extracting each towel from the group within which it was washed and flattening it out to feed an ironing or folding apparatus, etc., has been a hand operation. Obviously such a hand operation is expensive as compared to what the cost would be were the operation to be performed by apparatus. It will be rather apparent that without human vision and judgment it becomes rather difficult to reach into a tangled pile of items such as towels, handkerchiefs, etc., grasp one, and only one, and thereafter orient the towel in a predetermined position. The principal object of the present invention is to provide a method whereby such operation may be performed automatically and to provide automatic apparatus for performing the operation.

In the process we have devised, a towel or other similar object in the unoriented mass of similar objects is extracted from the mass. The point at which it is seized for extraction is a random point. A grip is then obtained on one corner of the towel. In the embodiments herein described the grip on this corner is obtained by reason of the fact that one corner of the towel will normally extend a farther distance from the random point of seizure than will the remaining three corners. Only in the very exceptional case, where the point of seizure is substantially at the center of the towel or midway between at least two corners, will more than one corner be substantially the same distance from the point of seizure. By encircling the towel and moving the plane of encirclement away from the point of seizure the corner farthermost from the point of seizure may be found. Having grasped the towel at one corner, the diagonally opposite corner of the towel is then grasped. This diagonally opposite corner is determined by reason of the fact that that corner will be the greatest distance from the corner originally grasped than will any of the two remaining corners. Again the towel is encircled and the first corner grasped moved away from the plane of encirclement to ascertain the diagonally opposite corner.

The towel then is supported by the two corners that have been grasped with the corners being spaced sufficiently apart that the portion of the towel therebetween is substantially taut. With the two grasped corners held in a generally horizontal plane there will be two triangular portions of the towel hanging down at each side of the line between the two grasped corners. The two triangular portions are then engaged and moved into a common horizontal plane. Upon the completion of these steps the towel will be generally flat in that horizontal plane and will have a predetermined orientation fixed by the initial alignment of the two corners originally grasped. Thus, the towel may now be deposited upon a conveyor or the like for feeding automatic machinery to iron, fold, etc., the towel.

The foregoing steps of the process all can be performed by hand. For example, the fingers of one hand can grasp a towel at random. The towel can be encircled with the fingers of the other hand and drawn therethrough until it is felt that the trailing corner is about to leave the other hand at which time it will be grasped. By encircling the towel with the first hand the diagonally opposite corner can be located, etc. However, the principal advantage of the process lies in the fact that the same steps can be performed by automatic apparatus. By eliminating hand labor processing costs and other problems attendant thereupon, e.g., absenteeism, are ameliorated or eliminated.

Other objects and advantages will become apparent from the following description of specific embodiments taken in conjunction with the drawings in which:

FIGURE 1 is a side elevation in schematic form of an embodiment of the invention;

FIGURE 2 is a side elevation of the embodiment of FIGURE 1 illustrating an alternative position of the parts;

FIGURE 3 is a side elevation of the embodiment of FIGURE 1 illustrating a successive step in the process;

FIGURE 4 is a partial side elevation illustrating a further step;

FIGURE 5 is a side elevation illustrating a still further step;

FIGURE 6 is an isometric view of the portion of the apparatus of FIGURE 1 for grasping the corners of the towel;

FIGURE 7 is a section taken at line 7—7 of FIGURE 1;

FIGURE 8 is a plan view of the grasping head of FIGURE 1 illustrating the grasping webs in the non-grasping position;

FIGURE 9 is a plan view of the grasping head illustrating the grasping webs in grasping position;

FIGURE 10 is a section taken at line 10—10 of FIGURE 9;

FIGURE 11 is an exploded view of the two rings of the grasping head;

FIGURE 12 shows the two rings of FIGURE 11 in assembled position;

FIGURE 13 is a side elevation of a second embodiment of the invention;

FIGURE 14 is a plan view of the embodiment of FIGURE 13;

FIGURE 15 is an enlarged view of one of the vacuum pickup heads as seen along line 15—15 of FIGURE 13 with portions broken away;

FIGURE 16 is a further enlarged view of the end of one of the vacuum pickup heads;

FIGURE 17 is an enlarged elevational view of the vacuum pickup wheel with portions broken away and illustrating one of the vacuum pickup heads;

FIGURE 18 is an enlarged elevational view of the pairs of grippers and arms therefor as viewed along line 18—18 of FIGURE 14;

FIGURE 19 is an enlarged view of the cams for the grippers and gripper arms;

FIGURE 20 is an enlarged partial section as seen along line 20—20 of FIGURE 19;

FIGURE 21 is an enlarged elevational view of one of the pairs of grippers and gripper arms as seen in FIGURE 18; the grippers 210, 211 are not normally in the position shown in FIGURE 21, as they are normally spread about in this position (as shown in FIGURE 18) but are moved into close proximity in FIGURE 21 to save space;

FIGURE 22 is a section taken along line 22—22 of FIGURE 21;

FIGURE 23 is an enlarged plan view of one of the grippers;

FIGURE 24 is a bottom view of the structure of FIGURE 23;

FIGURE 25 is a plan view of the vacuum takeoff heads;

FIGURE 26 is a side elevation of the vacuum heads of FIGURE 25;

FIGURE 27 is a section as viewed along line 27—27 of FIGURE 26; and

FIGURE 28 is a schematic, isometric, view of the drive mechanism for the vacuum heads of FIGURES 25-27.

EMBODIMENT OF FIGURES 1–12

The embodiment illustrated in these figures includes a frame generally 10, a vacuum pickup generally 11, grasping means generally 12, a towel flattening means generally 13, and a conveyor generally 14.

The vacuum pickup 11 includes a vacuum tube 16 mounted for vertical movement in a case 17. Case 17 of course is supported on frame 10. Means not shown is provided in case 17 for vertically moving tube 16. The lower end of tube 16 is open, and connected to the upper end is a flexible hose 18 which communicates with the hollow interior of tube 16 and wtih a suitable source of vacuum in case 17.

Immediately below vacuum pickup 11 is the grasping means generally 12, which includes a pair of grasping heads generally 20 and 21. As best seen in FIGURE 6 the two heads 20 and 21 are in vertical alignment. Lower head 21 is fixed to an L-shaped arm 22 which also is secured to shaft 23. Shaft 23 is suitably journaled in a bearing 24 secured to frame 10. Shaft 23 is hollow and rotatably mounted therein is an inner shaft 25 to which grasping head 20 is affixed. A mounting bracket 26 is secured to inner shaft 25 and carries a suitable operating means such as a solenoid or air cylinder 27 which moves plunger 28.

A similar bracket 30 is secured to arm 22 to mount a solenoid or air cylinder 31 actuating plunger 32. A second bracket 33 is secured to arm 22, extending in the opposite direction from bracket 30, to mount a solenoid or air cylinder 34 actuating plunger 35. The outwardly extending end of plunger 35 is rotatably pinned to a crank 36 secured to inner shaft 25.

The structure of grasping heads 20 and 21 is illustrated in FIGURES 8–12. Each comprises an annular shell 38 having a bottom flange 39. As seen in FIGURE 10, shell 38 has an offset forming a groove 37 along the upper edge thereof to receive and support a ring 40. Ring 40 is held in place in the groove 37 in shell 38 by means of a plurality of small locking plates 41 held in place by screws 42. Ring 40 thus is secured to shell 38 but is rotatable with respect to the shell. Ring 40 has an operating bracket 43. On gripping head 20 bracket 43 is attached to plunger 28, while on gripping head 21 bracket 43 is attached to plunger 32 (see FIGURE 6).

Flange 39 and ring 40 each have eight holes therein. Between these holes is stretched an elastic lacing which acts as a gripper. For convenience in describing the manner of lacing, the holes in the bottom flange 39 have each been given a number prefaced by the letter "B" (for bottom as seen in FIGURES 8–12) and the holes in the ring 40 have been prefaced by the letter "T" (for top). Thus the eight holes in ring 40 are T1, T2, T3, T4, T5, T6, T7 and T8, whole the holes in flange 39 are designated B1, B2, B3, B4, B5, B6, B7 and B8. The manner of lacing is best illustrated in FIGURE 8. There it will be seen that starting with hole T1 in ring 40 the lacing is as follows: T1 to B4; B4 to B5; B5 to T2; T2 to T3; T3 to B6; B6 to B7; B7 to T4; T4 to T5; T5 to B8; B8 to B1; B1 to T6; T6 to T7; T7 to B2; B2 to B3; B3 to T8; and T8 to T1. As bracket 43 is moved in the direction indicated by arrow 44 (FIGURE 8) by plunger 28 or 32, ring 40 is rotated with respect to flange 39 so as to move the crosswise lacings toward the center of shell 38. This closes the space between the lacings and the lacings will grip whatever is between them. For example, in FIGURE 8 as ring 40 is rotated counterclockwise with respect to shell 38 the lacing between hole T1 and hole B4 will be elongated and moved toward the center or axis of the shell 38.

Flattening means 13 includes pairs of wheels 48 to permit it to be rolled along frame 10 which forms a track for the wheels. Depending from body 49 are a pair of brackets 50 to which the pin of a leaf hinge 51 is secured. Mounted on the opposite sides of leaf hinge 51 are a pair of vacuum boxes 52 which are hollow inside and along the inner face have vacuum ports 53. The hollow interior of vacuum boxes 52 communicates with a pair of vacuum hoses 54 which lead to a suitable source of vacuum, not shown. A pair of racks 55 are guided for vertical movement and are connected by links 56 to angles 57 secured to vacuum boxes 52. Racks 55 are moved vertically by a train of gears 58 connected to a suitable power source, not shown.

Operation of Embodiment of FIGURES 1–12

In this embodiment towels in a pile 62 are picked up one at a time to be flattened. To do this vacuum tube 16 is lowered through the gripping heads 21 and 22 as illustrated in FIGURE 1. Vacuum is applied to tube 16 and as the lower end of the tube comes in contact with a towel, that towel is held by the vacuum on the lower end of the vacuum tube. The vacuum tube is then raised so that the towel 63 on the end of the tube is raised towards the position illustrated in FIGURE 2.

As the towel is raised it passes through the light beam immediately below grasping head 20 which light beam extends between a light source 64 and a photoelectric cell unit 65. As the lowermost end of the towel passes out of the light beam the light beam is reestablished between the light source 64 and the photoelectric cell 65 and the photoelectric cell actuates solenoid 27 to move plunger 28 and rotate ring 40 in the direction illustrated by arrow 44 in FIGURE 8. Ring 40 is turned to the position illustrated in FIGURE 9 at which position the lowermost corner of the towel is grasped by the lacing of gripping head 20. Thus the light source 64 and the cell 65, along with the associated electrical controls, forms a sensing means to determine when a corner of the towel will be within gripper 20. Unless the towel has been grasped by vacuum tube 16 about its exact midpoint, one corner of the towel will hang down farther than will the remaining portions of the towel. It will be this lowermost corner that will be the last to pass through the light beam and when the light beam is reestablished this one corner will be within gripping head 20. Provision for rejecting the towel, should more than one corner be caught in gripping head 20, subsequently will be described.

The continued upward movement of vacuum tube 16 pulls the towel from the vacuum tube. Thereafter the vacuum to tube 16 is shut off and air cylinder 34 is actuated to rotate inner shaft 25 through about 135°. This will cause towel 63 to hang down from gripping head 20 which is holding it. The lowermost corner of the towel 63 will then hang within gripping head 21 as illustrated in FIGURE 3. If more than one corner of the towel has been grasped by gripping head 20 the towel will not hang down sufficiently far to cut the light beam between light source 66 and photoelectric cell mechanism 67. This will signal that there has been an occurrence of one of the few instances when a towel will be grasped by more than one corner by gripping head 20. Assuming that the usual case has occurred wherein the towel 63 has been grasped at only one corner by gripping head 20 the towel will hang down and cut the light beam from light source 66 to allow the operation to proceed.

The next operation in the sequence is that solenoid 31 is actuated to move plunger 32 and close the lacing of gripping head 21 above the lowermost corner of the towel. Shaft 23 is then rotated clockwise a distance of 90° by a suitable power means (not shown) so as to move the grasping means 12 from the vertical position of FIGURES 1–3 to the horizontal position illustrated in FIGURES 4 and 5. As will be apparent in FIGURE 4, the towel is now grasped at two diagonally opposite corners by gripping heads 20 and 21. The line between the two corners is generally taut with two triangular portions of the towel hanging downwardly from that line.

The flattening means 13 now is rolled over the towel 63 so positioned. In doing so the racks 55 have been raised to position the two vacuum boxes 52 in a generally horizontal position. With the raising of racks 55, brackets 50 slide upwardly on pin 60 within slot 59 in the brackets 50. After moving over the towel as illustrated in FIGURE 4, racks 55 are moved downwardly. During the initial portion of that movement the vacuum boxes 52 will remain generally horizontal with brackets 50 sliding downwardly on pins 60. When pins 60 reach the upper end of slot 59 the vacuum boxes 52 will start pivoting on hinge 57 toward each other. They will then come down on opposite sides of towel 63. This is illustrated in FIGURE 5. Vacuum is applied to the vacuum heads 52 through hoses 54 and the sides of the towel will be held by ports 53.

Racks 55 are again raised and the two triangular sides of towel 63 are drawn away from each other by the spreading movement of vacuum boxes 52. At the same time grippers 20 and 21 are opened so as to release the corners of the towels that were held by the grippers. When the vacuum box has reached the horizontal position the flattening means 13 is rolled to the right over conveyor 14 to the position illustrated in dotted lines in FIGURE 5. At this time vacuum to the two vacuum boxes 52 is shut off and the towel will thereupon fall flat on conveyor 14. It will be readily apparent that the towel will have a predetermined orientation on the conveyor 14 in addition to lying flat thereon. The conveyor 14 then can move the towel to the next processing step.

EMBODIMENT OF FIGURES 13–28

The embodiment illustrated in FIGURES 13–28 includes a frame generally 75, a feed mechanism generally 76, a vacuum pickup mechanism generally 77, a gripper mechanism generally 78, a vacuum takeoff and spreader mechanism generally 79, and power means generally 80.

*Feed Mechanism 76*

The feed mechanism 76 includes a hopper 82 mounted on frame 75 into which the towels are transferred as by means of a chute 83 or by such other means as the user may desire. Below hopper 82 is a belt conveyor comprising a belt 84 mounted on rollers 85 and 86. Roller 85 is fixed to a shaft 87 suitably journaled in bearings 88. Roller 86 is similarly attached to a shaft 89 journaled in bearings 90.

Immediately adjacent the area where belt 84 passes about roller 86 is positioned a distribution wheel 93. Wheel 93 has a hub 94 which is journaled on a fixed shaft 95. Shaft 95 is hollow and is connected to a suitable source of vacuum by pipe 96. The end of shaft 95 opposite pipe 96 is closed. Shaft 95 is mounted on frame 75 by means of a pair of blocks 97. Wheel 83 has a plurality of hollow spokes 98 with the hollow interior thereof extending through hub 94 and also forming openings 99 about the periphery of wheel 93. Shaft 95 has cutouts extending through the wall thereof in alignment with spokes 98 with the openings extending in a clockwise direction in FIGURE 13 from about 6 o'clock to about 2 o'clock on shaft 95. Thus by means of these openings vacuum is applied through pipe 96 and shaft 95 to openings 99 when said openings move clockwise in FIGURE 14 from about the 6 o'clock position to about the 2 o'clock position. From the 2 o'clock position to the 6 o'clock position the vacuum is shut off so that there is no vacuum being applied to openings 99.

To the right of wheel 93 in FIGURES 13 and 14 is a belt conveyor 102 which is mounted on rollers 103 and 104. Roller 104 is attached to a shaft 105 journaled in bearings 106. Similarly roller 103 is attached to a shaft 107 journaled in bearings 108. Along the sides of belt 102 are a pair of guides 109.

The feed mechanism is driven by a motor 112 having a pulley 113 on the shaft thereof. A right angle gearbox 114 has a pulley 115 on the input shaft and a pulley 116 on the output shaft. A belt 117 connects pulleys 113 and 115.

An idler shaft 119 is suitably journaled on frame 75 and is driven from pulley 116 by means of a belt 120 which engages a pulley (not shown) on shaft 119. Shaft 119 also carries a second pulley (not shown) which drives a belt 121 and in turn drives a pulley 122 secured to wheel 93. A third pulley (not shown) on shaft 119 drives a belt 124 which in turn drives a pulley 125 secured to shaft 107. A fourth pulley 126 secured to shaft 119 drives a pulley 127 on shaft 89 by means of a belt 128.

Thus with the energizing of motor 112 the top run of belt 84 is driven in the direction indicated by arrow 130. Distribution wheel 93 is rotated in the direction indicated by the arrow 131. The top run of belt 102 is driven in the direction indicated by the arrow 132.

*Vacuum Pickup 77*

Vacuum pickup mechanism 77 is illustrated in FIGURES 13–17. It includes a shaft 135 mounted in support blocks 136. Shaft 135 is hollow and is closed at one end. At the other end a pipe 137 connects the hollow interior of shaft 135 with a suitable source of vacuum. Rotatably mounted on shaft 135 is a sleeve 138. Sleeve 138 carries a gear 139 and a hub 140.

A cam mounting plate 142 is fixedly mounted on shaft 135 and carries two cams. Cam 143 is a box cam whose cam track is seen at 144. A face cam 145 also is secured to cam mounting plate 142.

As best seen in FIGURES 15 and 17, hub 140 is five sided and has five pickup arms extending therefrom. Each pickup arm is identical and only one will be described. The pickup arms include an outer tube 148 fixed to hub 140. Slidably received within outer tube 148 is an inner tube 149. Each of tubes 148 and 149 are hollow with the interior thereof communicating with an opening 150 in sleeve 138. At the outer end of inner tube 149 is a pressure tube 151 which likewise is hollow throughout its length. Thus a passageway exists from opening 150 to the outer end of tube 151. Shaft 135 has a slot 152 in alignment with opening 150. This slot extends in a counter clockwise direction from about 6:30 o'clock to about 2 o'clock in FIGURE 17. Thus during this portion of the travel of each pickup arm, vacuum from pipe 137 is applied to the passageway from opening 150 to the end of pressure tube 151.

Secured to each of the five sides of hub 140 is a cylindrical guide 155. Guide 155 is reciprocally received in a guide block 156 secured to inner tube 149. Guide block 156 carries a cam follower 157 which engages box cam 143. At the opposite side of guide block 156 from guide 155 are a pair of push rods 158. Push rods 158 are reciprocally mounted in guide block 156 as well as in a second guide block 159 secured to inner tube 149. At the upper end of push rods 158 is a cam mounting block 160. Cam block 160 is secured to each of rods 158 and carries a cam follower 161 which engages cam 145. Springs 162 about each of push rods 158 between guide block 159 and cam mounting block 160 resiliently urge the cam mounting block 160 away from guide block 159.

At the outer ends of push rods 158 is a pincer mounting block 164 which is secured to each of the push rods. A pair of pincers 165 and 166 are pivotally secured to block 164 by bolt 167. At the outer end of each of pincer 165 and 166 is a projecting finger 168 and 169, respectively. As seen in FIGURE 17, fingers 168 and 169 will extend down over the mouth of pressure tube 151 when the pincers are closed. A pincer operating block 170 is secured to inner tube 149 in a position to engage the upper ends of pincers 165 and 166. A spring 171 connects the upper ends of pincers 165 and 166 so as to urge fingers 168 and 169 towards each other.

A spring 172 about pressure tube 151 resiliently urges the mouth of pressure tube 151 away from inner tube 149. Means not shown are provided to prevent pressure tube 151 from extending more than a given distance out of inner tube 149.

*Gripper Mechanism 78*

The gripper mechanism 78 is illustrated in FIGURES 13, 14 and 18–24. Gripper mechanism 78 includes a cam plate 180 secured to frame 75 by supporting members 181 (FIGURE 14). Cam plate 180 has a cam track 182 therein forming a box cam (FIGURES 19 and 20). A plurality of brackets 183 secured to cam plate 180 support a mounting plate 184. On one side of mounting plate 184 is a cam 185 for the rearward gripper and on the opposite side is a cam 186 for the foreward gripper, as hereinafter described. Cam plate 180 has a series of spokes 187 secured to a hub 188. Hub 188 is journaled on a shaft 190.

Shaft 190 is journaled in bearings 191 and has a gear 192 secured to one end thereof. As best seen in FIGURES 18, 21 and 22, shaft 190 has a hub 194 secured thereto. Mounted on hub 194 are six pairs of gripper arms. One pair is illustrated in FIGURES 21 and 22. The foreward arm with respect to the direction of rotation is arm 195 while the rearward arm is arm 196. The direction of rotation is indicated by arrow 197. Arm 195 is secured to shaft 198 which is mounted in bearings 199 in hub 194. Arm 196 is attached to a shaft 200 similarly journaled in hub 194. Levers 202 and 203 are attached to shafts 198 and 200 respectively. A link 204 is pivotally connected to each of levers 202 and 203. Attached to each of arms 195 is a cam follower mounting bracket 205 which carries a cam follower 206 riding in cam track 182.

Attached to foreward arm 195 is a gripper, generally 210, and attached to gripper arm 196 is a gripper, generally 211. With respect to the direction of rotation 197, gripper 210 is the foreward gripper and it is the one that will be described in detail. Gripper 211 is a mirror image of gripper 210. The structure of the grippers is best seen in FIGURES 21–24.

Gripper 210 includes a generally T-shaped body 212 having a plate 213 at the end of one arm of the T. The gripper is in a generally scissor form having one blade 214 fixed to body 212. The movable blade 215 is attached to a shaft 216 which shaft is rotatably mounted in boss 217 of body 212. A rocker 218, likewise is attached to shaft 216. A pair of pushing solenoids 220 and 221 are mounted on body 212, each being connected to one arm of rocker 218. For example, the armature 222 (FIGURE 23) has a connecting rod 223 which is pivotally secured to one end of rocker 218 by pins 219. A spring 224 connects movable blade 215 and plate 213 to normally urge blade 215 against blade 214.

Foreward gripper 210 has a cam follower 227 which is positioned to engage cam 186. Similarly rearward gripper 211 has a cam follower which is positioned to engage cam 185. Cam follower 227 is rotatably mounted on the stub end 229 of a cocking lever 230. A spring 231 connects stub end 229 with the post 232 on plate 213 to normally urge the cocking lever in a clockwise direction as seen in FIGURE 23 or a counterclockwise direction as seen in FIGURE 24. Stub 229 and cocking lever 230 are attached to a shaft 233 which is suitably journaled in body 212. Also attached to shaft 233 is a cocking arm 234. The extending end of cocking lever 230 is pivotally connected to guide rod 235 which guide rod is slidably received in a boss 236 of body 212. The opposite end of guide rod 235 is threaded to receive a nut 237 under which is a cushioning washer 238.

The outer end of fixed blade 214 is supported by an angle brace 242 attached to body 212. Adjacent the outer end of fixed blade 214 is a rotatable shaft 243. The upper end of shaft 243 has a hook-shaped finger 244 affixed thereto (FIGURE 23). On the lower end of shaft 243 a link 245 is affixed to the shaft with the outstanding end of the link having a cam follower 246 thereon (FIGURE 24). Shaft 243 has an eccentrically positioned opening on the lower end thereof into which one end of spring 247 is hooked. The other end of spring 247 is hooked on the mounting post 248 for angle brace 242 (see FIGURES 21 and 24). Thus looking at FIGURE 24, spring 247 urges shaft 243 in a clockwise direction and holds cam follower 246 against cocking arm 234. Co-planar with the finger is a stop 249 fixed to member 214.

Immediately below shaft 216 and boss 217 is a second boss 251 in which is journaled a shaft 252. Attached to shaft 252 is a clevis 253 extending from which is a sensor bar 254. A finger 255 having a cam follower 256 on one end thereof also is attached to clevis 253. Follower 256 is positioned to contact cocking lever 230. A spring 257 engages clevis 253 at one end and plate 213 at the other.

The inward face of fixed blade 214 has a depending flange 260. The flange is recessed along the outer portion of its bottom edge to receive a downwardly extending plate 261 which is secured to the flange (see FIGURES 21 and 24). Plate 261 extends down sufficiently far so as to be in alignment with sensor bar 254 (see FIGURE 21). Underneath blade 214 and behind flange 260 is a microswitch 262 having an actuating arm 263. A pin 264 is slidably received through flange 260 in a position to contact the end of actuating arm 263. Clevis 253 has an upwardly extending portion 265 positioned to contact the opposite end of pin 264 and actuate the microswitch when the sensor bar 254 is against plate 261. Microswitch 262 is connected into a circuit with solenoid 220 so as to energize solenoid 220 to close moveable blade 215 against fixed blade 214 when sensor bar 254 moves against plate 261. The movement is aided by spring 224 which spring will thereafter hold the moveable blade 215 against fixed blade 214.

As has been mentioned gripper 211 is a mirror image of gripper 210. It will be noted in FIGURE 21 that with respect to the direction of rotation 197 of the grippers, the sensor bar 254 is on the leading side of gripper 210 while the moveable blade 215 and finger 244 are on the trailing side. On gripper 211 the moveable blade, finger and stop are on the leading side while the sensor bar is on the trailing side.

Vacuum Takeoff and Spreader Mechanism 79

The vacuum takeoff and spreader mechanism generally 79 is illustrated in FIGURES 13, 14 and 25–28. Suitably journaled on frame 75 are a pair of rotating shafts 275 and 276. The shafts are hollow with one end of each shaft being connected to and communicating with a slip joint 277 while the opposite ends of each of shafts 275 and 276 are closed. Pipes 278 leading to a suitable source of vacuum (not shown) connect to slip joints 277. Shaft 275 has a sprocket 279 on the closed end thereof while shaft 276 has a sprocket 280. Mounted on shaft 275 are a plurality of vacuum heads 282. Similarly shaft 276 carries a plurality of vacuum heads 283. Each of vacuum heads 282 and 283 is hollow and has a semicircular outer face with a plurality of ports, 284 and 285, respectively, therein. Each vacuum head is secured to its respective shaft by a set screw 286. An opening 287 through the wall of shafts 275 and 276 provides communication between the hollow interior of the shafts and interior of vacuum heads 282 and 283 respectively.

On a portion of the frame 75 extending over the vacuum heads are brackets 300 which support the takeoff mechanism. Except for the fact that one is a mirror image of the other these takeoff mechanisms are identical and the one over vacuum heads 282 will be described. Pivotally mounted on a pin 301 is a cylindrical block 302. Depending from the block is an arm 303 which extends through an opening in block 302 and is threaded in the top end to receive a nut 304. Below block 302 is an annular shoulder 305 on arm 303. A spring 306 positioned between shoulder 305 and block 302 urges arm 303 downwardly with nut 304 against the top of block 302.

A sleeve 308 on arm 303 provides an anchor for a spring 309 which at its other end is secured to an adjusting stud 310 in a depending portion of bracket 300. At the lower end of arm 303 is a cam block 311. Projecting outwardly from block 311 is a takeoff finger 312. As will be seen from FIGURES 25 and 26 fingers 312 are positioned between pairs of vacuum heads 282 and 283. A positioning stop 313 is threaded into brackets 300 to contact a second arm 314 extending from cylindrical block 302.

On the side of one of the pairs of vacuum heads 282 between which fingers 312 are positioned is a plate 317. At one end plate 317 fits about shaft 275. At the other end it carries a cam pin 318 in a position to contact cam block 311. A slot 319 in plate 317 is positioned to receive an adjusting screw 320, which screw is threaded into the wall of vacuum head 282. By releasing adjusting screw 320 plate 317 may be moved relative to vacuum head 282 to properly position pin 318. When the proper positioning has been determined screw 320 is tightened to fix plate 317 in that position.

Positioned between pairs of vacuum heads 282 are a plurality of stripper fingers 323 mounted on a cross rod 324. Spacers 325 on rod 324 position fingers 323. Fingers 323 are pivotable on rod 324 and bear against a cross rod 326 at one end of the finger. A similar set of stripper fingers 327 are mounted on cross rod 328 between vacuum heads 283. Fingers 327 bear against cross rod 329 and are aligned by spacers 330.

Below vacuum heads 283 is a fixed plate 331 pivotally supported on pins 332 with the other end having an adjustment bracket 333. A screw 334 is threaded into the wall of frame 75 extends through a slot 335 in bracket 333. Thus the rearward end of plate 331 may be raised or lowered with respect to the path of movement of vacuum heads 283. A belt 337 forming a takeoff conveyor moves about a roller 338 mounted on shaft 339. Shaft 339 is suitably journaled in frame 75.

Power Means 80

The power means 80 for driving the flattening device of FIGURES 13 and 14 is driven by a motor 344. Motor 344 is belt connected to a variable speed drive 345 which in turn is belt connected to the input shaft of a right angle drive 346. Right angle drive 346 has output shafts on both sides thereof. On one of the output shafts is a sprocket 347 driving a chain 348 which in turn drives a sprocket 349. Referring to FIGURE 28, sprocket 349 is attached to a shaft 350. Shaft 350 is suitably journaled into frame 75 and has mounted thereon a gear 351, a sprocket 352 and a sheave 353. Sheave 353 drives a belt 354 and a sheave 355 mounted on shaft 339. A chain 356 connects sprockets 280 and 352. Gear 351 engages gear 357 on shaft 358. Shaft 358 is suitably journaled in frame 75 and carries a sprocket 359. Sprocket 359 drives sprocket 279 through the interconnection of chain 360.

Referring to FIGURE 27 the power means 80 so far described rotates vacuum heads 283 in the direction indicated by arrow 363. Vacuum heads 282 are rotated in the head in the direction indicated by the arrow 364. The top run of belt 337 is moved in the direction indicated by the arrow 365.

On the other output shaft of gear box 346 is a sprocket 367 which drives a chain 368 and a sprocket 369 on shaft 370. Shaft 370 is suitably journaled in frame 75. Two bevel gears 371 and 372 are attached to shaft 370. Gear 371 engages gear 192 on shaft 190. Gear 372 engages a gear 373 on shaft 374 which is suitably journaled in frame 75. A gear 375 attached to shaft 374 drives gear 139. By the foregoing drive connections shaft 190 is rotated so as to move gripers 210 and 211 in the direction indicated by arrow 197, while vacuum pickup heads on sleeve 138 are rotated in the direction indicated by arrow 377.

Operation of Embodiment of FIGURES 13–28

In this embodiment the towels or other objects which are to be flattened and aligned on conveyor belt 37 are dumped into hopper 82. A small number of the towels are withdrawn from the hopper 82 by conveyor belt 84 and moved over against distribution wheel 93. As wheel 93 rotates some of the towels will cover openings 99 of the spokes 98 and thus the vacuum being applied to these openings will pick up the towels and carry the towels about the top of wheel 93 with the rotation of that wheel. As such towels get to the opposite side of the wheel 93 they are dropped onto conveyor belt 102 when the vacuum is shut off from the spoke by the valve arrangement on shaft 95 internally of hub 94. Wheel 93 merely acts to space out the towels so that no large group of them will arrive at the vacuum pickup mechanism 77 at any one time.

With the rotation of the sleeve 138 and hub 140 of the vacuum pickup mechanism 77, each of the pickup arms will come down towards the towels on belt 102 in the direction indicated by arrow 377. As each arm approaches the position vertically above belt 102, cam track 144 gives a downward movement to cam follower 157 and thus to the tubes of the pickup arm. From the cam track 144 as seen in FIGURE 17 it will be apparent that the pickup arms make what may be described as a pecking motion at the towels on conveyor belt 102. At this time cam follower 161 is not engaged so that spring 162 has moved push rods 158 upwardly bringing the upper portions of pincers 165 and 166 into contact with the pincer opening block 170. Thus the pincers will be open as seen in FIGURE 15.

As the vacuum pickup arm makes the pecking movement just described and comes into contact with a towel on the top of conveyor belt 102, the vacuum in the tubes 148, 149 and 151 will cause a towel to fasten itself to the open mouth of tube 151. Since conveyor belt 102 is open mesh, if no towel is below the mouth of tube 151 the tube will continue to move away from the conveyor belt. The tube 151 is resiliently mounted in tube 149 so as to bring the mouth of tube 151 firmly into contact with the top of any towels on belt 102. If there should be more than one towel under the mouth of tube 151 the tube will merely slide a little farther into tube 147 with the uppermost towel being grasped by the vacuum existing at the mouth of tube 151.

As the vacuum pickup head then continues its movement in the direction indicated by arrow 377 with the towel hanging down from the mouth of tube 151, cam follower 161 will come into contact with cam 145. This will push outwardly on cam follower mounting block 160, push rods 158 and pincer mounting block 164. The movement of pincer mounting block 164 away from pincer cam block 170 will permit spring 171 to close pincers 165 and 166. As the pincers close fingers 168 and 169 move about the mouth of tube 151 to firmly grasp the towel that was picked up by the vacuum applied to the vacuum pickup tubes. The towel so grasped will be moved upwardly in the direction indicated by arrow of rotation 377. After the pickup arm with the towel so held has moved about 70° from the vertical position illustrated in FIGURE 17 it will commence passing between a pair of grippers 210 and 211.

At this time the grippers will have been positioned side by side as best seen at the right hand side of FIGURE 18. The cam followers on the cocking arms, e.g. follower 227 on cocking arm 230, will have engaged their respective cam tracks 185 and 186 so as to pivot the fingers back (the position illustrated at 244′ in FIGURE 23) and to move the two sensor bars, e.g. 254 in line with the two movable blades, e.g. 215, which blades have been opened as illustrated in FIGURES 22-24. This setting of the grippers provides an unobstructed space between the two movable blades, the sensor bars and the stops 249. It is within this truncated triangular space that the vacuum pickup arm moves with the towel.

Sleeve 138 is rotating at a somewhat faster speed than is shaft 190. Thus after passing through the space within the grippers the vacuum pickup heads tend to move away from the grippers. However, before they have moved too far, cam tracks 185 and 186 end so as to release the cocking levers, e.g. lever 230. This permits the fingers 244 to rotate to the position illustrated in FIGURES 22 and 23 by reason of the pull of spring 247, trapping the towel within the space defined by the curved finger 244 and the stop 249. At the same time spring 257 pulls sensor bar 254 out from under the movable blade 215 and over towards the fixed blade 214. This in addition to being trapped within the space between finger 244 and stop 249, the towel will be pressed against plate 261 by sensor bar 254. As the vacuum pickup continues to move away from the grippers it will pull the towel through the foregoing described entrapment and particularly the pressure of sensor bar 254 tends to draw out any folds in the towel.

The rearward gripper 211 has its sensor bar at the rearward side of the gripper. As the rearward corner of the towel 380 reaches the position illustrated at 380a in FIGURE 18, the rearward corner of the towel passes from under sensor bar 254 and permits the sensor bar to move against plate 261 at which time it presses on plunger 264 to actuate microswitch 262. This energizes solenoid 220 to push movable blade 215 clockwise in FIGURE 23 to grasp the towel between movable blade 215 and fixed blade 214. In the usual case only one corner of the towel will be trapped. If the towel was grasped by fingers 168 and 169 at about its midpoint it is possible for more than one corner to be trapped by gripper 211 when the towel is in the 380a position. However as subsequently described provision is made for dropping a towel which has been so trapped.

At about the time the towel is in the 380a position, pincers 165 and 166 will be opened. At this time the pickup tube that was holding the towels will be about 30° short of the vertically upright position.

As the grippers 210 and 211 move approximately to the upright position in FIGURE 18, cam 180 commences pivoting follower 206 about shafts 198. This pivots arm 195 away from arm 196 and the linkage between the two arms likewise pivots arm 196 away from arm 195. With the towel being held by gripper 211 it is drawn through gripper 210. As seen at 380c, the towel has been part way drawn through gripper 210. If the microswitch on gripper 210, which corresponds to microswitch 262 on gripper 211, is actuated after the arms 195 and 196 have moved apart a distance less than the diagonal length of the towel this will signify that more than one corner of the towel was trapped and held by gripper 211. Controls (not shown) are provided so that when this happens both gripper 210 and 211 will be opened and the improperly trapped towel will be dropped on chute 384 (FIGURES 13 and 14).

However, in the usual case where only one corner of the towel has been grasped by blades 214 and 215 of the gripper, all of the towel will continue to be threaded through gripper 210. It will be remembered that on gripper 210 the sensor bar corresponding to 254 is on the leading side of the gripper, while the blades corresponding to 214 and 215 are on the trailing side. As the leading edge of the towel is drawn from under the sensor bar by a spreading movement of the arms, the microswitch corresponding to 262 is actuated to move the movable blade over against the fixed blade corresponding to blades 215 and 214 respectively. Thus the towel will now be held by one corner by gripper 211 and by the diagonally opposite corner by gripper 210.

As the towel reaches the 380e position of FIGURE 18, it passes between the vacuum heads 282 and 283 of the vacuum takeoff and spreader mechanism 79. At this time the vacuum heads will be just approaching the position illustrated in FIGURE 27. When the towel has just about reached its centered position between the vacuum heads the vacuum heads will be rotating in the directions indicated by the arrows 363 and 364 from the position illustrated in FIGURE 27. The continued rotation of the heads pivots takeoff fingers 312 about pins 301 so that they each move upwardly and toward each other. The fingers 312 press against opposite sides of the towel to support the towel momentarily for transfer from grippers 210 and 211 to vacuum heads 282 and 283.

At the moment fingers 312 engage the towel, solenoids 221 are energized to push blades 215 away from blades 214 and release the towel from the grippers 210 and 211. At the same time the continued rotation of vacuum heads 282 and 283 will bring more of ports 284 and 285 into contact with the sides of the towel. Since cam pins 318 will have passed beyond cam blocks 211, the fingers 312 will be permitted to return to the position illustrated in FIGURE 27 to release the towel. With this release the vacuum heads 282 and 283 draw the opposite sides of the towel down about and under the vacuum heads. The forward moving corner of the towel will be pressed against belt 337 by vacuum head 282 with the towel passing under stripper fingers 323. Belt 337 is moving at the same lineal speed as that of vacuum head 282. Thus more and more of the towel commencing with the forward corner thereof will be drawn out onto belt 337.

The rearward corner of the towel will be moved across plate 331 by vacuum head 283. It will pass under stripper fingers 327 which will release the towel from the vacuum ports 283. As soon as the slack is drawn from the middle of the towel all of the towel will be drawn out onto belt 337 with the leading corner thereof about in the middle of the belt and aimed in the direction indicated by arrow 365. The diagonally opposite corners of the towel which were gripped by grippers 210 and 211 will be at opposite sides of belt 337 with the line therebetween being approximately at right angles to the line of travel of belt 337. Of course the fourth corner will be about in the middle of the belt trailing the remainder of the towel.

Subject matter disclosed herein but not claimed is disclosed and claimed in our copending application, Serial No. 137,935, filed August 25, 1961.

The foregoing description of specific embodiments is for the purpose of complying with 35 USC 112 and should not be construed as imposing unnecessary limitations upon the appended claims inasmuch as modifications thereof will be apparent to those skilled in the art. For example, the feed mechanism 76 could be dispensed with or other means provided for moving a few towels at a time along belt 102 to a position under the vacuum heads on the vacuum pickup mechanism 77.

Subject matter herein described is claimed in our copending application S.N. 137,935, filed August 25, 1961, entitled, "Automatic Towel Flattening Device."

We claim:
1. The method of flattening towels or the like of a generally rectangular configuration having four corners, said method including: the steps of grasping the towel at a random point therealong; encircling said towel; moving said point relative to said encirclement until the rearwardmost corner of said towel reaches said encirclement; grasping said corner; grasping the corner diagonally opposite said rearwardmost corner; holding said corners in a generally horizontal plane with the line of towel between the corners substantially taut whereby the portions of the towel at each side of said line hang down at each side of said line; engaging said portions of said towel; and moving said portions into a common plane.

2. The method of flattening towels or the like of a generally rectangular configuration having four corners, said method including: the steps of grasping the towel at a random point therealong; encircling said towel; moving said point relative to said encirclement until the rearwardmost corner of said towel reaches said encirclement; grasping said corner; drawing said towel away from said corner whereby the farthermost point of the towel will be the diagonally opposite corner of the towel; grasping said opposite corner; holding said corners generally in a horizontal plane with the line of towel between the corners substantially taut whereby the portions of the towel at each side of said line hang down at each side of said line; engaging said portions of said towel; and moving said portions into a common plane.

3. The method of grasping and orienting a towel or the like of a generally rectangular configuration having four corners, said method including: the steps of grasping the towel at a random point therealong; encircling said towel; moving said point relative to said encirclement until the rearwardmost corner of said towel reaches said encirclement; grasping said corner; grasping the corner diagonally opposite said rearwardmost corner; holding said corners apart with the line of the towel between the corners substantially taut; and extending the other two corners of the towel to one side of said line in juxtaposition to each other.

4. The method of flattening a towel or the like of a generally rectangular configuration having four corners, said method including: the steps of grasping the towel at a random point therealong; encircling said towel; moving said point relative to said encirclement until the rearwardmost corner of said towel reaches said encirclement; grasping said corner; grasping the corner diagonally opposite said rearwardmost corner; holding said corners apart with the line of the towel between the corners substantially taut; extending the other two corners of the towel to one side of said line in juxtaposition to each other; and separating said other two corners and moving them into a plane which is parallel to and intersects said line.

References Cited in the file of this patent

UNITED STATES PATENTS

| | | |
|---|---|---|
| 2,226,659 | Collins | Dec. 31, 1940 |
| 2,394,692 | Isler | Feb. 12, 1946 |
| 2,447,559 | Bloemers | Aug. 24, 1948 |
| 2,464,556 | Clark | Mar. 15, 1949 |
| 2,645,364 | Herrcke | July 14, 1953 |